United States Patent

[11] 3,601,499

| [72] | Inventor | John H. Ellinger |
| | | Mickleover, Derby, England |
| [21] | Appl. No. | 834,125 |
| [22] | Filed | June 17, 1969 |
| [45] | Patented | Aug. 24, 1971 |
| [73] | Assignee | Rolls Royce Limited |
| | | Derby, England |
| [32] | Priority | June 22, 1968 |
| [33] | | Great Britain |
| [31] | | 29883/68 |

[54] GEAR DRIVE FOR VARIABLE PITCH AEROFOIL ASSEMBLY
6 Claims, 2 Drawing Figs.

[52] U.S. Cl. ........................................... 416/160, 416/155
[51] Int. Cl. ........................................... B63h 3/06
[50] Field of Search........................................... 416/46, 48, 155, 160, 157, 139, 140, 153, 154

[56] References Cited
UNITED STATES PATENTS

| 2,640,552 | 6/1953 | Chillson | 416/160 (X) |
| 2,699,220 | 1/1955 | Mergen et al. | 416/160 (X) |
| 3,467,198 | 9/1969 | Ellinger | 416/147 |
| 3,468,473 | 9/1969 | Davies et al. | 416/157 |

*Primary Examiner*—Everette A. Powell, Jr.
*Attorney*—Cushman, Darby & Cushman

ABSTRACT: A gear drive for variable pitch aerofoil comprises a common gear wheel adapted to drive the aerofoils to vary their pitch, a plurality of compound epicyclic wheels engaging with the common wheel and the drive shaft of the aerofoil, a carrier from which are carried the epicyclic wheel and drive means for the carrier adapted in one mode to hold the carrier stationary and in another mode to cause the carrier to rotate with the drive shaft.

PATENTED AUG 24 1971

Inventor
JOHN HENRY ELLINGER

By
Cushman, Darby & Cushman
Attorneys

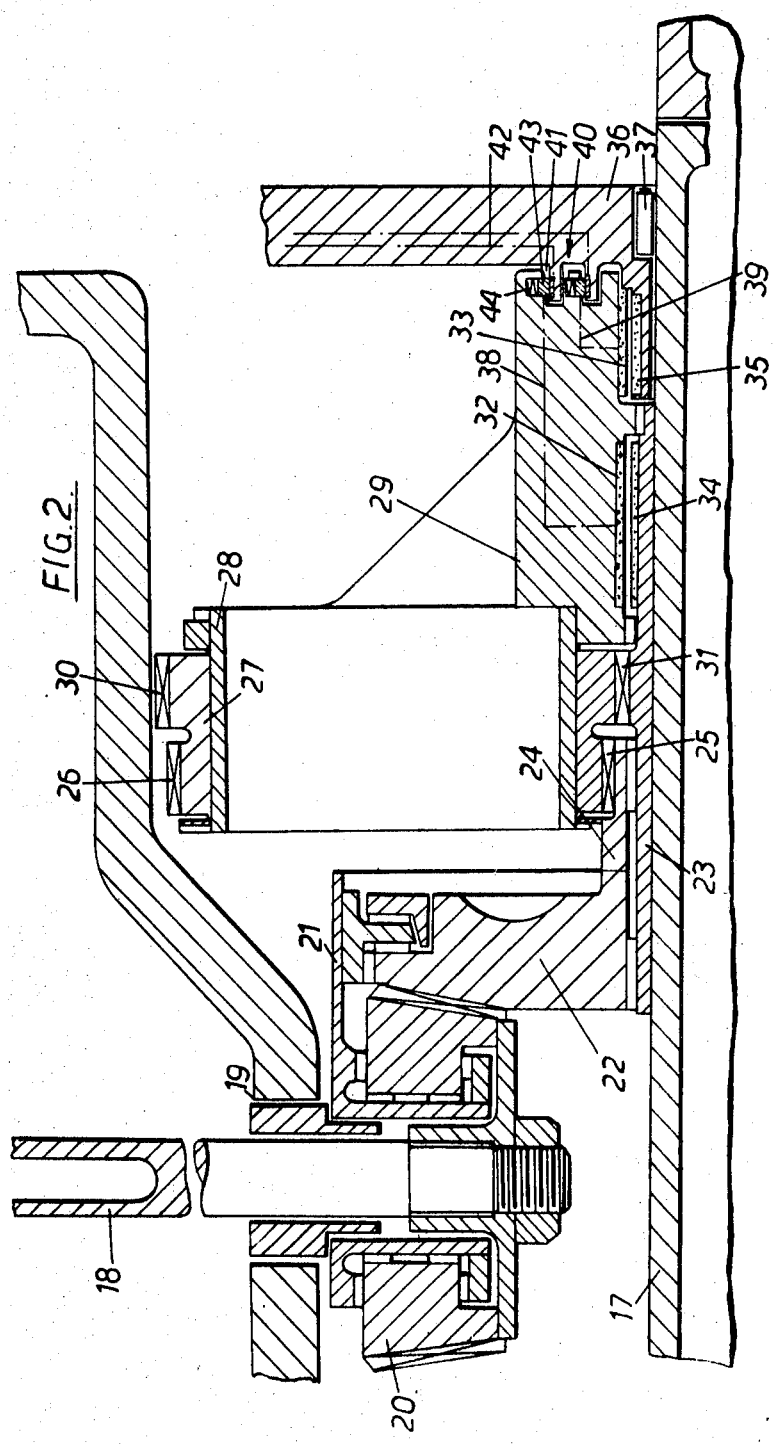

GEAR DRIVE FOR VARIABLE PITCH AEROFOIL ASSEMBLY

This invention relates to a gear drive for varying the pitch of the aerofoil blades of a fan, and relates particularly to the variable pitch blades which are the subject matter of my copending application number 686,435, filed Nov. 29, 1967 for "Variable Pitch Aerofoil Baldes" (now abandoned in favor of a continuation application filed on the same subject on May 4, 1970).

The above-mentioned describes variable pitch aerofoil blades comprising a plurality of aerofoils driven from a mainshaft to rotate about the shaft axis and each mounted so that at least part of each aerofoil or hydrofoil is rotatable about its longitudinal axis, a gear train drivingly connected to each said part for rotating the part about its longitudinal axis, said gear train having at least one mode of operation in which it is adapted to rotate said parts about their longitudinal axes in such a manner that when the mechanism reaches an equilibrium position any disturbance affecting the aerofoils or hydrofoils causes a disturbance in the shaft rotation which then drives the gear train so as to cancel the effect of the disturbance.

The present invention provides a particularly simple gear drive which can be driven to allow for the pitch of aerofoil blades such as those in my aforesaid copending application 684,435 being considerably varied to provide, for instance, reverse thrust from the fan.

According to the present invention a gear drive for variable pitch aerofoils as set out above comprises a common gear wheel adapted to drive directly or indirectly said aerofoils to vary their pitch, a plurality of compound epicyclic wheels drivingly engaging both with said common gear wheel or an extension therefrom and with the drive shaft of said fan, and a carrier from which are mounted said compound epicyclic wheels, and drive means adapted in mode of operation to cause said carrier to rotate with said drive shaft and in a second mode of operation to hold said carrier stationary with respect to fixed structure of the fan.

Preferably said drive means is adapted in a third mode of operation to cause said carrier to rotate at a speed different from that caused in either of the first and second modes.

Said drive means preferably comprises an electrical stepping motor. Thus the stepping motor may comprise two pairs of pole rings, one pole ring of each pair being mounted on the carrier while the other members of each pair are mounted on the drive shaft and on fixed structure respectively.

Electrical supply means to said poles may comprise brushes and slip rings adapted to supply electricity to the rings of poles on the carrier only. In order to reduce wear on the brushes and to provide a safety device to prevent the motor being operated while the fan is rotating at high speed, the brushes are preferably spring loaded radially inwards to such an extent as to overcome centrifugal force tending to lift the brushes from the slip rings only at low rotational speeds of the fan, thus allowing the brushes to lift clear of the slip rings at high rotational speeds.

The invention will now be particularly described merely by way of example with reference to the accompanying drawings in which:

FIG. 2 is an enlarged section of part of the engine of FIG. 1 illustrating more clearly the gear drive which is in accordance with the invention.

Figure 1:
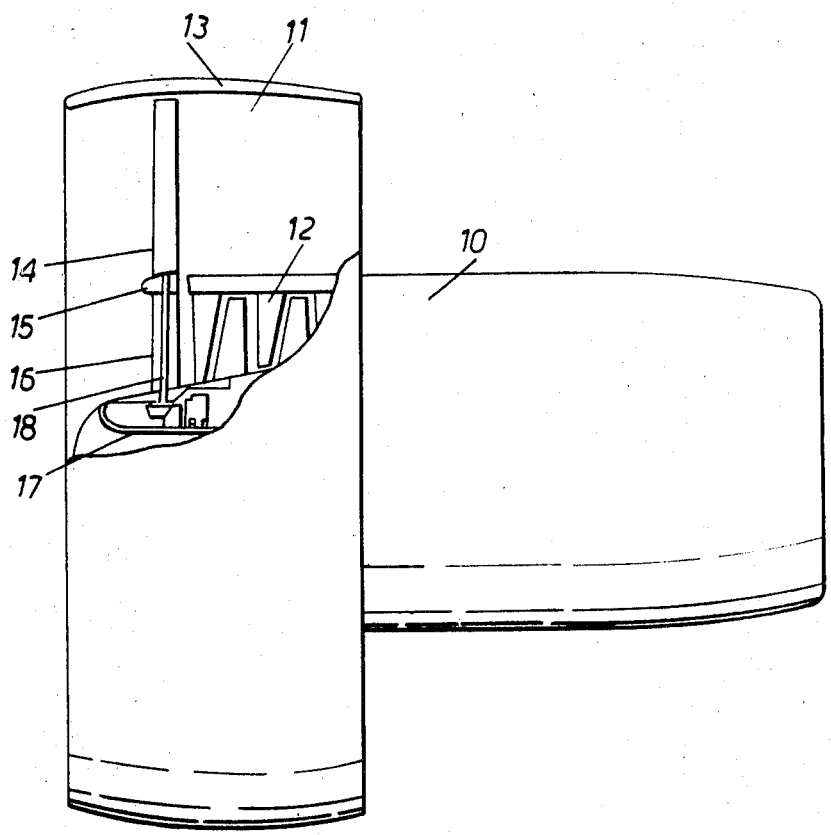
FIG. 1 is a partly broken-away view of a gas turbine engine incorporating a fan having a gear drive according to the present invention.

FIG. 1 shows a gas turbine engine comprising a gas generator section 10 and fan section 11. The gas generator section 10 comprises the usual combination of a compressor, combustion section, turbine and exhaust nozzle. The majority of this arrangement is invisible behind the casing of the gas generator; however, the first few stages of the compressor are visible through the casing which is broken away at 12.

The fan itself, as is well-known per se compresses a large volume of air part of which is used to supercharge the gas generator section 10 while the remainder flows around the outside of the casing of the gas generator providing a separate propulsive flow.

The fan itself comprises a shroud 13 which is partly broken away in the diagram so that the internal parts of the fan may be seen. These comprise a plurality of outer blade sections 14 mounted from a blade ring 15, each outer blade portion being mounted for rotation about its own axis on the blade ring 15. The blade ring 15 is mounted from a plurality of inner blade portions 16 from hub structure of the fan which comprises a main fan shaft 17 which is turned back upon itself at its upstream extremity to form a substantially cylindrical mounting structure for the inner blade portions 16.

In order to rotate the outer blade portions 14 about their largest axes to vary their pitch, a plurality of shafts 18 extend outwardly through the hub structure and through the inner blade portions 16 into the blade ring 15. Within this blade ring there is mounted the necessary gear drive to rotate the outer blade portions 14 from the shafts 18. This gear drive is preferably that which is disclosed in my previous copending application 686,435, as identified above. As can best be seen in FIG. 2 each drive shaft passes through an aperture 19 in the hub structure of the fan and terminates in a pinion 20. The pinions 20 are mounted in a journal and thrust bearing arrangement from a supporting sleeve 21. all the pinions 20 mesh with a single bevel wheel 22 which surrounds the main shaft 17 and is carried on bearings from a sleeve 23 which is attached to the shaft 17. A further set of bearings are provided to maintain the axial alignment of the bevel wheel 22 with respect to the supporting sleeve 21 and hence with respect to the pinions 20. The structure as so far described is identical to that disclosed in my above-mentioned copending application.

In my copending application a drive means is described by which the bevel wheel 22 may be caused to rotate at the same speed as the shaft 17, or alternatively, may be caused to be stationary with respect to fixed structure of the engine, thus providing two modes of operation in one of which the outer blade portions 14 would be maintained at a fixed pitch angle and in the other of which these blade portions are caused to vary their pitch until the main shaft 17 becomes stationary with respect to fixed structure of the engine, hence providing no further drive to the outer blade portions.

The primary intention of the present invention is to provide a driving mechanism for the bevel wheel 22 to enable the variation of the pitch of the fan blades to be used to provide reverse thrust from the fan 11. Such a drive must satisfy three functional requirements additional to those required in the apparatus described in our copending application. Thus the twist and disposition of the blades must permit adequate blade movement to obtain a sufficient degree of reverse thrust. Locking in the hub area (which also produces turbulence in the engine intake) and inefficient flow conditions at the blade tips require an unconventional form of fan blade to be used. Secondly it must be permissible to vary the pitch of the blades to their reverse thrust position while the fan is windmilling so that features designed to prevent pitch variation and to offload the gear drive at high rotational speeds may be retained. Thirdly as a practical limitation it should be possible to vary the pitch of the blades at a rate of some 20° per second.

The gear drive which is described below meets these requirements. In order to drive the bevel wheel 22 the wheel is provided with a cylindrical axial extension 24 which has a ring of teeth 25. These teeth mesh with a first gear 26 on a compound epicyclic wheel 27 which is carried on a cylindrical journal 28 from a carrier structure 29. The other ring 30 on the compound epicyclic wheel engages with a ring of teeth 31 formed in the sleeve 23 and hence rotating with the shaft 17. Although only one compound epicyclic wheel 27 is shown there will, in fact, be three or more of these epicyclic gears equiangularly spaced around the shaft 17.

The carrier member 29 is provided with means for clutching it to the shaft 17, to fixed structure of the engine or alternatively to cause it to rotate at a third and different speed. Thus the carrier member 29 has on its inner periphery two pole rings 32 and 33. These pole rings are adapted to coact with pole rings 34 and 35 respectively. The pole ring 34 is mounted from the sleeve 23 while the pole ring 35 is mounted to fixed structure 36 of the engine which is also used as a support for the front bearing 37 for the shaft 17. The pole rings 34 and 45 are passive rings and have no electrical connections thereto while the pole rings 32 and 33 are active rings and are supplied with electricity as shown by the dotted lines 38 and 39 respectively from brush and slip ring arrangements generally indicated at 40.

Each of these arrangements comprises a slip ring 41 mounted from the fixed structure 36 connected to a source of electrical supply as indicated by the chain dotted lines at 42. Bearing upon the slip ring 41 are a plurality of carbon brushes 43 which are spring loaded inwardly onto the slip ring by springs 44. The brushes and springs are mounted from the carrier structure 29 and are connected by the wires 38 or 39 to their respective pole ring. The loading of the springs 44 is carefully chosen so that only at low speeds of the shaft 17, when the carrier 29 is rotating at the same speed as the shaft, will the spring loading be sufficient to overcome centrifugal loads. Hence at high speeds of the shaft the brushes will automatically lift from the slip ring, reducing the wear and avoiding the possibility of actuation of the pole rings at high speeds of the fan. It will be appreciated that the various sets of pole rings are such that the carrier 29 can be operated as the stator of an electrical stepping motor.

Operation of the device is as follow:

In normal operation of the engine the carrier 29 which forms the stator of the stepping motor is locked by the rings of poles 32 and 34 to the shaft 17. Under these circumstances the compound planetary wheels 27 will orbit with the shaft but will not rotate about their own axis. This will cause the bevel wheel 22 to rotate at the same speed as the shaft 17, thus preventing rotation of the pinions 20 and consequent pitch variation of the blades. As there is no relative movement between the member components of the drive, wear is minimal and power consumption is negligible. In fact it is possible to arrange that the strength of the permanent magnets of the pole rings are such that the drive remains locked in the absence of an exciting current.

When reverse thrust is desired an actuating current is applied to the pole ring 32 by way of the wires 38 and 42 and the respective set of brushes and slip ring. In a well-known fashion this will cause the carrier 29 to rotate. The compound epicyclic wheels 27 will thus be caused to rotate about their own axes as well as orbit, and a drive will, therefore, be transmitted through these wheels to the bevel wheel 22 and hence to the outer blade portions. In this particular instance the gearing arrangement is designed to give a reduction ratio of 10 to 1 so as to reduce bearing loads of the planetary wheels and keep the speeds of the wheels 27 relatively low about their own axes to reduce problems of lubrication and to ease the metering of pulses to the poles. In order to decide when the reverse thrust position of the blades has been achieved it will be possible to count the stepping pulses supplied to the pole rings; since each of these pulses produces a set angular movement between carrier 29 and the shaft 17 it is possible to calculate the angular movement applied to the blade outer portions.

If, owing to some mishap, it is required to feather the blades of the fan to arrest the hub, the pole rings 33 and 35 are energized so that the carrier 29 is electromagnetically coupled to the fixed structure 36. The epicyclic wheels 27 will then rotate about their own axes but will not orbit thus inducing slip between the shaft 17 and the bevel wheel 22 causing the bevel wheel to rotate and feather the blades. Thus feathering continues until either the shaft 17 comes to rest, in which case there is no slip between the bevel wheel 22 and the shaft 17 and hence feathering of the blades ceases, or until the shaft overruns when the blades will be rotated in their opposite sense until they take up a position to arrest the hub. This same cycle will occur if alteration of any parameter varies the windmilling speed. In fact it will be seen that this device provides a feedback action similar to that produced by the mechanism described in out copending application mentioned above.

It will be seen that the device of the present invention avoids the use of synchromesh sleeves and clutches which are prone to wear but demands the use of slip rings. However, owing to the construction of the brushes and slip rings, during the majority of the time the brushes will not engage with the slip rings and hence very little wear will occur. It will be appreciated, therefore, that the present system provides an arrangement which fulfils the use of a particularly extensive amount of control equipment.

By the use of the stepping motor as the driving unit, several functions are combined in a single motor in an advantageous fashion. Thus the coils of the stepping motor provide electromagnetic clutches between the carrier 29 and the fixed structure of the engine or the main shaft 17. Additionally the motor provides a drive which can be much better controlled than a normal electric motor; the stepping motor can be precisely stopped at a predetermined position. It also enables the total rotation applied to the carrier to be precisely measured by summation of the applied electrical pulses.

I claim:

1. A variable pitch aerofoil assembly comprising:
   a plurality of aerofoil blades,
   a main drive shaft means having said plurality of aerofoil blades operatively attached thereto so that the blades can be rotated about the axis of said main drive shaft means,
   drive means for rotating the aerofoil blades about their own axes, said drive means including
   a. pinion means which are constrained to rotate with rotation of said main drive shaft means,
   b. bevel gear wheel means meshing with said pinion means,
   c. a ring of gear teeth carried from the bevel gear wheel means,
   d. a plurality of compound epicyclic wheels each having a first and a second set of teeth, the first sets meshing with the ring of gear teeth of the bevel gear wheel means,
   e. a gear track on the main drive shaft means meshing with the second sets of teeth on the epicyclic wheels,
   f. a rotatable carrier means carrying the plurality of epicyclic wheels and
   g. interconnection means which normally interconnect the carrier means and the main drive shaft means so that the carrier means and the main drive shaft means rotate at the same speed in a first mode of operation, and
   arresting means for arresting the carrier means when feathering of the blades is required for a second mode of operation.

2. A variable pitch aerofoil assembly as claimed in claim 1 and in which said drive means includes means to cause said carrier means to rotate, in a third mode of operation, at a speed different from that caused in either of the first and second modes.

3. A variable pitch aerofoil assembly as claimed in claim 2 and in which said interconnection means includes an electrical stepping motor.

4. A variable pitch aerofoil assembly as claimed in claim 3 and in which said stepping motor comprises two pairs of pole rings, one pole ring of each pair being mounted on the carrier means while the other members of the pair are mounted on the drive shaft means and on fixed structure respectively.

5. A variable pitch aerofoil assembly as claimed in claim 4 and in which electrical supply means to said poles comprises brushes and slip rings adapted to supply electricity to the rings of poles on the carrier means only.

6. A variable pitch aerofoil assembly as claimed in claim 5 and in which said brushes are spring loaded radially inwards to such an extent as to overcome centrifugal force tending to lift the brushes from the slip rings only at low rotational speeds of the fan, thus allowing the brushes to lift clear of the slip rings at high rotational speeds.